(12) United States Patent
Matsuzuki et al.

(10) Patent No.: US 9,505,149 B2
(45) Date of Patent: Nov. 29, 2016

(54) MOLD SET

(71) Applicant: Toshiba Kikai Kabushiki Kaisha, Chiyoda-ku, Tokyo (JP)

(72) Inventors: Isao Matsuzuki, Numazu (JP); Yoshihiro Yamamoto, Numazu (JP)

(73) Assignee: TOSHIBA KIKAI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/283,958

(22) Filed: May 21, 2014

(65) Prior Publication Data

US 2014/0348970 A1    Nov. 27, 2014

(30) Foreign Application Priority Data

May 22, 2013  (JP) ................. 2013-108158

(51) Int. Cl.
| B29C 43/52 | (2006.01) |
| B29C 33/02 | (2006.01) |
| B29C 33/34 | (2006.01) |
| B29C 43/06 | (2006.01) |
| B29C 31/00 | (2006.01) |

(52) U.S. Cl.
CPC ............. B29C 33/34 (2013.01); B29C 43/06 (2013.01); B29C 31/006 (2013.01)

(58) Field of Classification Search
CPC .................................................... B29C 33/34
USPC ....... 425/384, 395, 397, 398, 407–408, 417, 425/555, 394, 412, 422
See application file for complete search history.

(56) References Cited

U.S. PATENT DOCUMENTS

| 3,373,460 | A | * | 3/1968 | Ladney, Jr. ................. 425/416 |
| 3,584,109 | A | * | 6/1971 | Meadors et al. ............ 425/193 |
| 5,173,100 | A | * | 12/1992 | Shigyo .................... C03B 11/08 |
| | | | | 425/808 |
| 5,599,565 | A | * | 2/1997 | Dittlo ......................... 425/384 |
| 5,816,991 | A | * | 10/1998 | Sato ........................... 493/167 |
| 7,699,595 | B2 | * | 4/2010 | Spengler ..................... 425/149 |
| 2007/0092592 | A1 | | 4/2007 | Chiang |
| 2008/0282737 | A1 | | 11/2008 | Ohgami |

FOREIGN PATENT DOCUMENTS

| CN | 19551843 | 4/2007 |
| CN | 101370741 | 2/2009 |
| JP | H02-137740 | 5/1990 |
| JP | H02-192423 | 7/1990 |
| JP | H09-239757 | 9/1997 |
| JP | H09-268019 | 10/1997 |
| JP | 2007-131489 | 5/2007 |
| JP | 2007-153647 | 6/2007 |
| JP | 2010-089970 | 4/2010 |
| JP | 2010-222226 | 10/2010 |

(Continued)

OTHER PUBLICATIONS

English language abstract and translation of JP 2011-006270 published Jan. 13, 2011.

(Continued)

*Primary Examiner* — Joseph S. Del Sole
*Assistant Examiner* — Thukhanh T Nguyen
(74) *Attorney, Agent, or Firm* — DLA Piper LLP (US)

(57) ABSTRACT

A mold set according to embodiment comprising: a die including a plurality of parts and holding a molded material; and a back plate laid below the die.

5 Claims, 5 Drawing Sheets

(56) References Cited

FOREIGN PATENT DOCUMENTS

| JP | 2011-006270 | 1/2011 |
|----|-------------|--------|
| JP | 2012-116697 | 6/2012 |
| JP | 2012-116705 | 6/2012 |
| JP | 2013-028503 | 2/2013 |
| JP | 2014-051431 | 3/2014 |
| WO | WO 2014/051014 | 4/2014 |

OTHER PUBLICATIONS

English language abstract and translation of JP 2007-131489 published May 31, 2007.
International Search Report issued in PCT/JP2013/076163 dated Dec. 17, 2013 with Translation.
English Language Abstract and Translation for JP 2011-006270 published Jan. 1, 20111.
English Language Abstract and Translation for JP 2012-116705 published Jun. 21, 2012.
English Language Abstract and Translation for JP 2010-089970.
U.S. Appl. No. 14/671,307.
International Preliminary Report on Patentability issued in PCT/JP2013/076163 dated Mar. 31, 2015 with Translation.
Chinese Office Action issued in CN 201410217936.X on Feb. 1, 2016 with English Language Translation.
English Language Abstract and Translation of CN 1951843 published on Apr. 25, 2007.
English Language Abstract and Translation of CN 101370741 published on Feb. 18, 2009.
English Language Abstract and Translation for JP H09-268019 published Oct. 14, 1997.
English Language Abstract and Translation for JP H09-239757 published Sep. 16, 1997.
International Search Report issued in PCT/JP2013/076163 dated Dec. 17, 2013 with English Language Translation.
English Language Abstract and Translation of JP 2010-222226 published Oct. 7, 2010.
English Language Abstract and Translation for JP 2014-051431 published Mar. 20, 2014.
Japanese Office Action issued in JP 2014-538607 mailed Nov. 17, 2015 with English Language Translation.
Korean Office Action issued in KR10-2014-0060996 dated Jul. 29, 2015 with English Language Translation.
Taiwan Action issued in TW 103117147 on May 24, 2016 with English Language Translation.
Chinese Office Action issued in CN 201380050898.7 dated Jun. 24, 2016 with English Language Translation.
Japanese Office Action issued in JP 2013-108158 dated Aug. 23, 2016 with English language translation.
English language abstract and machine translation of JP H02-192423 published on Jul. 30, 1990.
English language abstract and machine translation of JP 2007-153647 published on Jun. 21, 2007.
English language abstract and machine translation of JP 2012-116697 published on Jun. 21, 2012.
English language abstract and machine translation of JP H02-137740 published on May 28, 1990.
English language abstract and machine translation of JP 2013-028503 published on Feb. 7, 2013.

\* cited by examiner

MOLD SET

CROSS-REFERENCE TO RELATED APPLICATIONS

This application is based upon and claims the benefit of priority from prior Japanese Patent Application No. 2013-108158, filed May 22, 2013, the entire contents of which are incorporated herein by reference.

BACKGROUND OF THE INVENTION

1. Field of the Invention

The present invention relates to a mold set and, for example, relates to a mold set configured to move between a plurality of handling units.

2. Description of the Related Art

Among molding apparatuses for pressure-molding a molded material by heat softening, an apparatus of the moving mold type in which the molding cycle is shortened by moving a mold set holding the molded material between a plurality of units, each of which performing heating treatment, a press molding process, or a cooling process, to advance each process of heating, molding, and cooling on a plurality of molded materials in parallel is known (see, for example, Jpn. Pat. Appln. KOKAI Publication No. 2007-131489).

The mold set generally includes an upper die and a lower die holding a molded material and a sleeve covering an outer circumferential portion of the upper die and the lower die. If movement, heat treatment, or a press process is performed on such a mold set, the mold set is likely to be damaged by a mechanical or thermal impact.

BRIEF SUMMARY OF THE INVENTION

A mold set according to an embodiment includes a die to hold a molded material by including a plurality of parts and a back plate laid below the die.

According to the present invention, a high-level of transportability can be ensured by preventing damage by a mechanical or thermal impact.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

[First Embodiment]

A mold set according to the first embodiment of the present invention will be described below with reference to FIGS. 1 to 7. In each figure, the configuration is schematically shown by scale-up, scale-down, or omission when appropriate.

Figure 1:
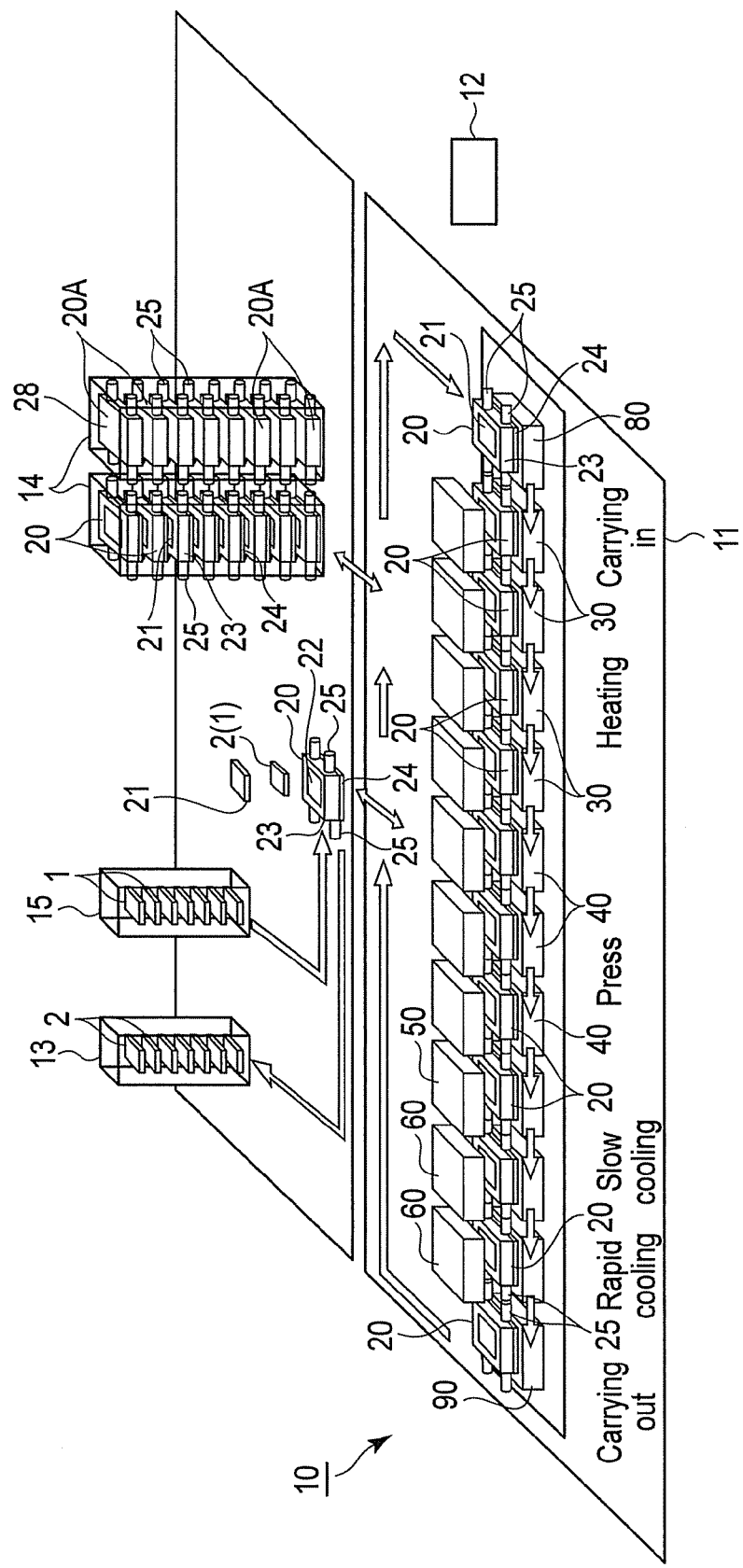
FIG. 1 is an explanatory view schematically showing the configuration of a molding apparatus according to a first embodiment of the present invention.
Figure 2:
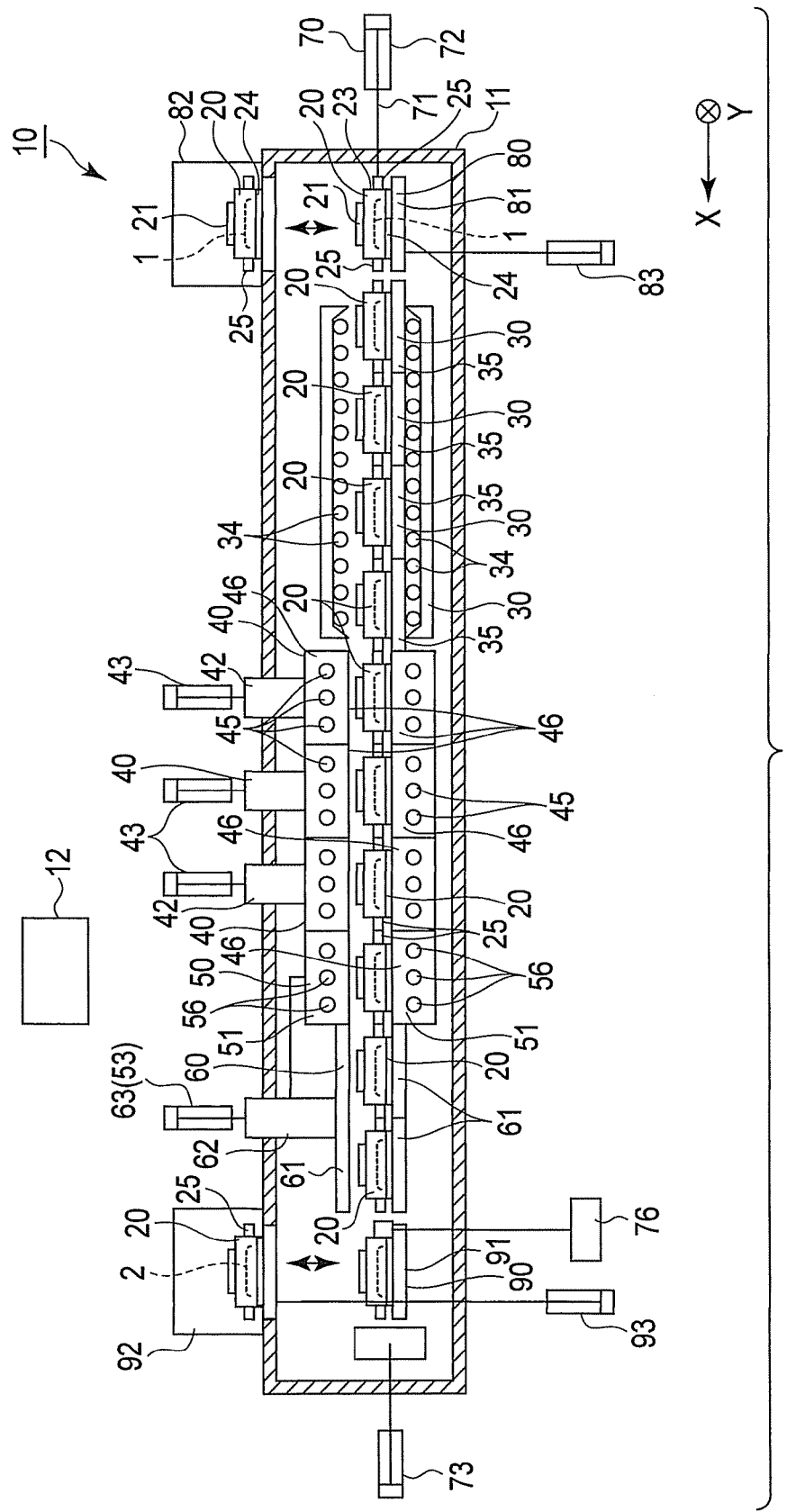
FIG. 2 is a side view schematically showing the configuration of the molding apparatus.
Figure 3:
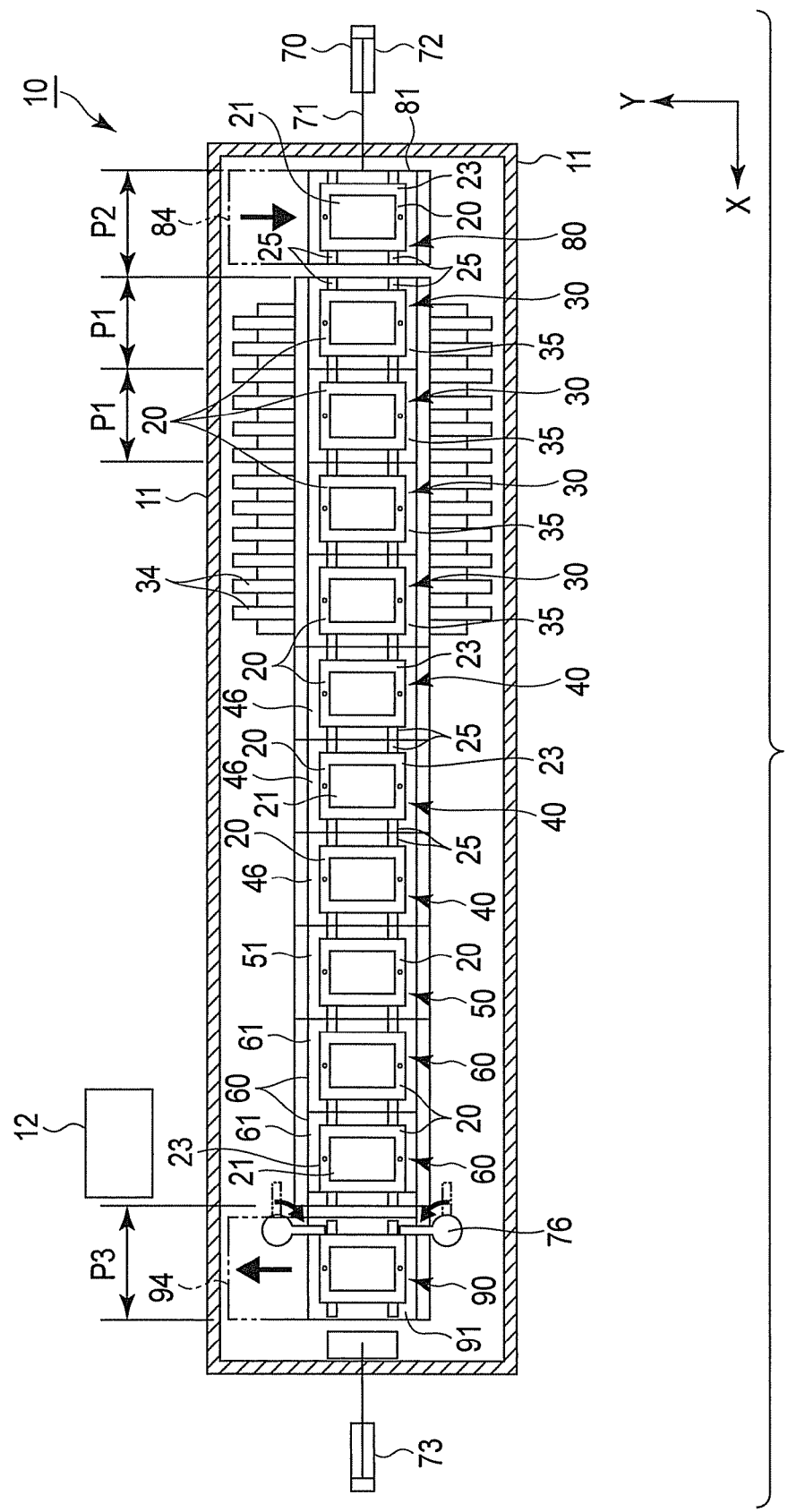
FIG. 3 is a plan view schematically showing the configuration of the molding apparatus.

A molding apparatus 10 shown in FIGS. 1 to 3 is the molding apparatus 10 that molds a molded material 1 such as a glass by a press process after the molded material being softened by heating treatment and manufactures a molded product 2 including cover glass for, for example, smartphones or tablet terminals.

The molding apparatus 10 includes a press unit 40 that performs a press molding process on the molded material 1 by applying pressure to the molded material 1 or a mold set 20 holding the molded product 2 as a molded product, a heating unit 30 that applies heat to the molded material 1 by heating the mold set 20 before the press molding process, a slow cooling unit 50 (cooling unit) that performs a slow cooling process while holding pressure of the molded product 2 after the molding process being performed thereon by the press unit 40, a rapid cooling unit 60 (cooling unit) that performs a rapid cooling process on the molded product 2 on which the slow cooling process has been performed, a transport unit 70 that transports the mold set 20, a carrying-in unit 80 and a carrying-out unit 90 provided on both ends of a transportation route along an arrow in the figure respectively, an isolation chamber 11 that accommodates these units 30, 40, 50, 60, 70, 80, 90 and also isolates these units from the outside atmosphere, and a control unit 12 that controls the operation of each of these units 30, 40, 50, 60, 70, 80, 90 and the isolation chamber 11.

In this configuration (embodiment), a heating station in which a plurality of the heating units 30 is contiguously arranged in parallel, a press station in which a plurality of the press units 40 is contiguously arranged in parallel, a slow cooling station in which the slow cooling unit 50 is arranged, and a rapid cooling station in which the rapid cooling unit 60 is arranged are arranged along the transportation route.

The lower plate of each unit in each station is contiguously arranged in parallel along the transportation route. A path through which the mold set 20 passes is formed on a sequence of plates. A plurality of the mold sets 20 is moved by the transport unit 70 successively from the upstream side to the downstream side along the path on the sequence of plates.

Regarding a plurality of the units 30, 40, 50, 60, the carrying-in unit 80, the four heating units 30, the three press units 40, the one slow cooling unit 50, the two rapid cooling units 60, and the carrying-out unit 90 are arranged in parallel at equal intervals (unit pitch) P1 in this order from one end (right side in FIG. 1) in a transportation direction along the X axis. Each of these units 30, 40, 50, 60 is configured to be able to be rearranged and increased/decreased.

Figure 4:
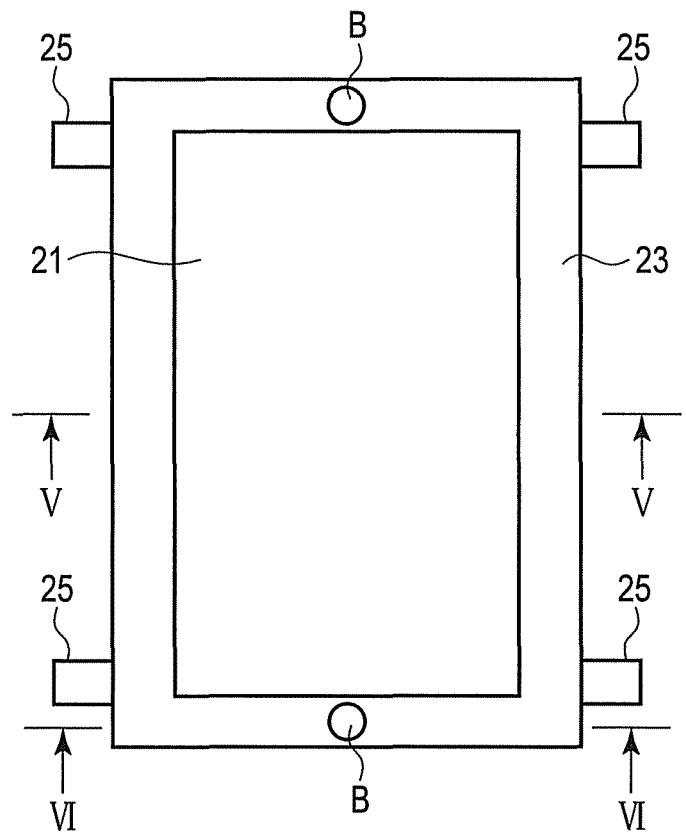
FIG. 4 is a plan view showing a mold set according to the embodiment.
Figure 5:
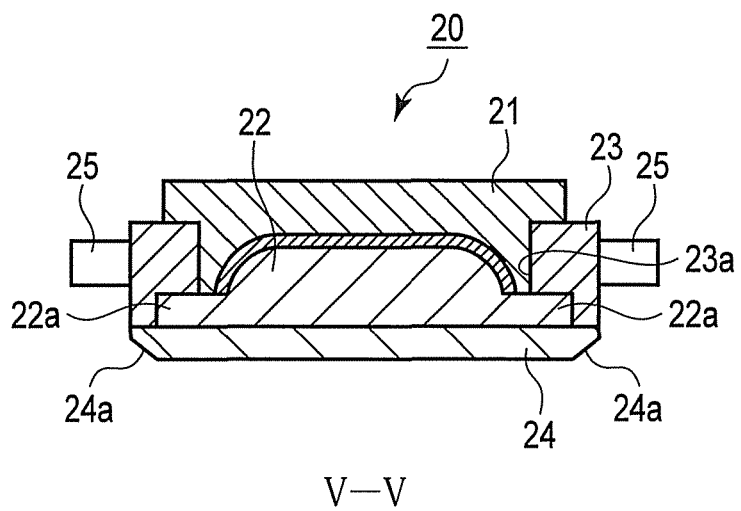
FIG. 5 is a V-V sectional view of FIG. 4.
Figure 6:
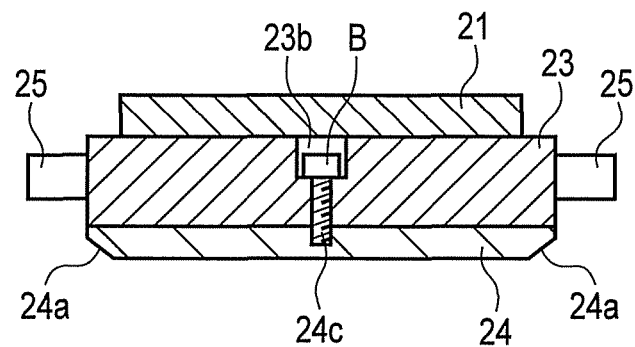
FIG. 6 is a VI-VI sectional view of FIG. 4.

As shown in FIGS. 4 to 6, each of the mold sets 20 includes an upper mold 21 (upper die) formed in accordance with an upper shape of the molded product 2, a lower mold 22 (lower die) arranged opposite to the upper mold 21 and formed in accordance with a lower shape of the molded product 2, a sleeve 23 that surrounds and supports the outer side of the upper mold 21 and the lower mold 22, and a back plate 24 laid below the lower mold 22.

The upper mold 21 and the lower mold 22 form a rectangular shape of a predetermined size having a cavity corresponding to the shape of the molded product 2 in a closed state. The molded material 1 in, for example, a plate shape is arranged between the upper mold 21 and the lower mold 22. A material having excellent heat resistance and material strength of high temperature is used as the material of the upper mold 21 and the lower mold 22. For example, glassy carbon, graphite, C/C composite or the like is used.

The upper mold 21 has, as shown in, for example, FIG. 5, a step shape in which an upper portion protrudes to the outer side more than a lower portion.

The lower mold 22 includes a protruding portion 22a in a collar shape protruding to the outer side on an outer circumference thereof. As shown in, for example, FIG. 5, the lower mold 22 has a step shape in which the lower portion protrudes to the outer side more than the upper portion and the lower portion constitutes the protruding portion 22a.

The upper mold 21 and the lower mold 22 are inserted into an installation portion 23a of the sleeve 23 in a rectangular shape and supported.

The sleeve 23 is made of a heat-resistant material such as graphite, C/C composite, carbide, tungsten alloys or the like and configured in a rectangular frame shape. The installation portion 23a into which the upper mold 21 and the lower mold 22 are inserted and held is formed in the center portion of the sleeve 23. The sleeve 23 forms a step shape opposed along the outer surface of the upper mold 21 and the lower mold 22 and the upper mold 21 and the lower mold 22 are positioned in predetermined positions by the step.

A pair of connecting pins 25 (connecting portions) protruding in the transportation direction is formed on end faces on both sides in the transportation route direction of the sleeve 23. The connecting pin 25 is an axis body configured by a material, for example, silicon nitride ($Si_3N_4$), stainless steel or the like whose thermal conductivity is small and the connecting pins 25 arranged in neighboring units come into contact contiguously in the transportation direction to convey an extruding force by the transport unit 70 described later. For example, a total of the four connecting pins 25, two pins on both sides in the width direction of the transportation route on each of both sides in the transportation direction, are provided.

The length of the sleeve 23 in the transportation direction including the connecting pin 25 on both sides is set to the same length as the unit pitch P1, which is the inter-unit interval of the carrying-in unit 80, the heating unit 30, the press unit 40, the slow cooling unit 50, the rapid cooling unit 60 and the carrying-out unit 90. That is, the connecting pin 25 is configured such that the connecting pins 25 of the mold sets 20 placed in neighboring units come into contact with each other and are contiguous.

The back plate 24 is configured in a rectangular plate shape having a fixed thickness and is arranged below the lower mold 22. The back plate 24 is made of a material, for example, molybdenum, tungsten allows, C/C composites or the like.

As shown in FIGS. 4 and 6, the back plate 24 is fastened to the sleeve 23 by a fixture such as a bolt B on both sides in the width direction perpendicular to the transportation direction of the mold set 20. With this fixing of the back plate 24 and the sleeve 23, the protruding portion 22a is sandwiched between the step of the sleeve 23 and the back plate 24 in a space formed therebetween and the lower mold 22 is positioned and fixed.

A guide portion 24a having an inclined plane inclined with respect to the up and down direction and the transportation direction is provided on both ends in the transportation direction on the undersurface of the back plate 24. The guide portion 24a is set to an inclination of, for example, 10° to 20. Thanks to the guide portion 24a, extruded transportation of the mold set 20 is made smooth between top surfaces of plates of neighboring units.

Figure 7:
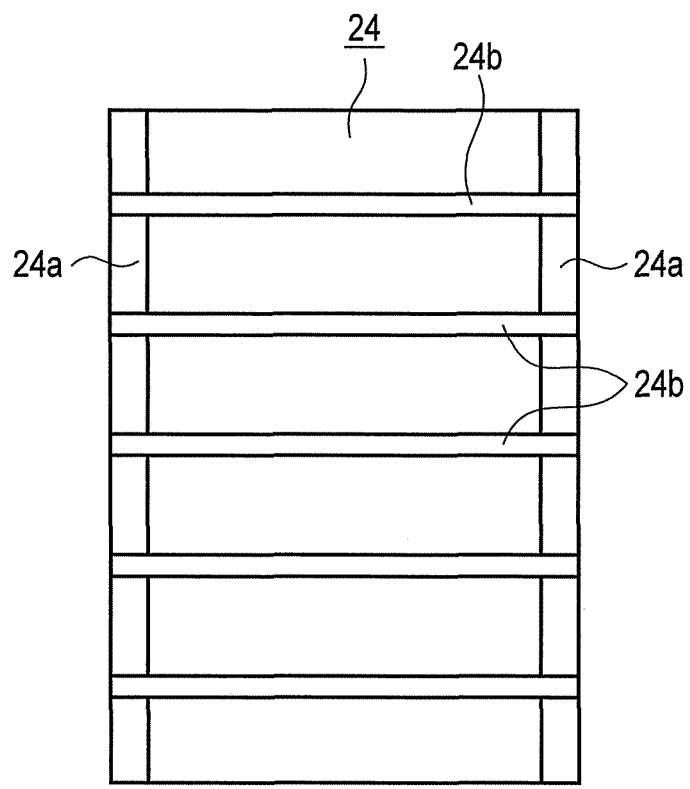
FIG. 7 is a bottom view of a back plate of the mold set according to the embodiment.

As shown in FIG. 7, a plurality (here, five) of grooves 24b for air vent is formed on the undersurface of the back plate 24. Each of these grooves 24b extends in parallel along the transportation direction. The groove 24b reduces sliding friction to enable a smooth transportation process that slides the back plate 24 along the transportation direction.

Each of the plurality of heating units 30 arranged in parallel in the transportation direction includes an upper heater unit 31 and a lower heater unit 32 arranged vertically like sandwiching the mold set 20 therebetween. Each of the upper heater unit 31 and the lower heater unit 32 has a plurality of rows of infrared lamps 34 arranged as a heater mechanism.

A mounting plate 35 on which the mold set 20 is placed is fixed on the rows of the lower infrared lamps 34. The mounting plate 35 is made of a material, for example, SiC or the like having high thermal conductivity and is configured in a rectangular plate shape. The heating unit 30 configured as described above applies heat while the mold set 20 successively transported by the transport unit 70 is placed on the lower mounting plate 35.

Each of the plurality of press units 40 arranged in parallel in the transportation direction includes a pair of upper and lower press plates 46 arranged like sandwiching the mold set 20 therebetween. Each of the press plates 46 is configured in a rectangular plate shape and is formed of a material such as carbide or SiC having high thermal conductivity and acting as a rigid material. An infrared lamp 45 is provided in the press plate 46 as a heater mechanism. A press axis 42 is connected to the upper press plate 46. The press axis 42 is connected to an ascent/descent mechanism unit 43 such as a servo motor, an air cylinder or the like and is configured to move vertically in accordance with the control of the control unit.

The press unit 40 configured as described above applies heat to the mold set 20 set up between the pair of plates 46 by the infrared lamp 45 and also a press process to apply pressure to the mold set 20 between the pair of plates 46 is performed by lowering the upper press plate 46 by ascent/descent movement of the upper press plate 46.

The slow cooling unit 50 arranged in parallel in the transportation direction as a first cooling unit includes upper and lower slow cooling plates 51 (cooling units) arranged vertically like sandwiching the mold set 20 therebetween.

The upper and lower slow cooling plates 51 are configured in a rectangular plate shape and is formed of a material such as carbide or SIC having high thermal conductivity and acting as a rigid material. The upper and lower slow cooling plates 51 have an infrared lamp 56 incorporated as a heater mechanism for slow cooling. A path for the mold set 20 to pass is formed between the upper and lower slow cooling plates 51.

The lower slow cooling plate 51 is configured just like the lower press plate 46. The upper slow cooling plate 51 has, like the upper press plate 46, a press axis connected thereto and is configured to be able to ascend and descend by an ascent/descent mechanism unit 63.

A slow cooling process is performed while holding pressure that maintains a fixed pressing force by lowering the upper slow cooling plate 51 by the ascent/descent mechanism unit 63 and applying pressure to the mold set 20 put on the lower slow cooling plate 51.

The rapid cooling unit 60 as a second cooling unit includes upper and lower cooling plates 61 (cooling units) arranged vertically like sandwiching the mold set 20 therebetween, a support axis 62 extending in the up and down direction by being linked to the upper cooling plate 61, and the ascent/descent mechanism unit 63 such as a servo motor, an air cylinder or the like connected to the upper cooling plate 61.

The upper and lower cooling plates 61 are configured in a rectangular plate shape and is formed of a material such as carbide, SiC, hardened stainless or the like having high thermal conductivity and acting as a rigid material. The cooling plates 61 have a refrigerant pipe constituting a channel allowing a coolant to flow incorporated thereinto. In addition, each of the upper and lower cooling plates 61 is provided with a plurality of thermocouples. Further, the upper cooling plate 61 is configured to be able to ascend and descend vertically by the ascent/descent mechanism unit 63.

A rapid cooling process is performed by lowering the upper cooling plate 61 by driving the ascent/descent mechanism unit 63 and applying pressure to the mold set 20 put on the lower cooling plate 61 after coming into contact therewith.

Incidentally, a thermocouple is provided in each of the units 30, 40, 50, 60 and the temperature in the course of process is detected and used for feedback control by the control unit 12.

As shown in FIGS. 1 to 3, the carrying-in unit 80 is provided on one end side in the transportation direction, that is, next to the heating unit 30 (right side in the figures). The carrying-out unit 90 is provided on the other end side in the transportation direction, that is, downstream side of the rapid cooling unit 60.

The transport unit 70 includes a cylinder shaft 71 that reciprocates along the transportation direction, an air cylinder 72 for transportation as an extruding mechanism that moves the cylinder shaft 71 in the transportation direction by being connected to the control unit, and a stopper portion 73 that regulates the position of the mold set 20 on the downstream side in the transportation direction.

The cylinder shaft 71 extends coaxially with the connecting pin 25. The air cylinder 72 for transportation is installed on an end of the carrying-in side of the isolation chamber 11 and has a function of extruding the connecting pin 25 in a fixed stroke along the transportation direction. With each of the mold sets 20 being extruded in the transportation direction by accompanying movement of the extruded connecting pin 25, the plurality of mold sets 20 is successively transported together from the one end side to the other end side in a fixed stroke.

The carrying-in unit 80 includes a carrying-in plate 81 on which the mold set 20 is placed to move by ascending or descending, a load lock chamber 82 provided in the upper portion of the carrying-in station, an ascent/descent mechanism unit 83 that moves the carrying-in plate 81, and a movement mechanism unit 84 provided in the lower portion of the load lock chamber 82.

The carrying-out unit 90 is arranged on the other end side in the transportation direction, that is, downstream side of the rapid cooling unit 60. The carrying-out unit 90 includes a carrying-out plate 91 on which the mold set 20 is placed to move by ascending or descending, a load lock chamber 92 provided in the upper portion of the carrying-out station, an ascent/descent mechanism unit 93 that moves the carrying-out plate 91, and a movement mechanism unit 94 provided in the lower portion of the load lock chamber 92.

Further, outside the isolation chamber 11 of the molding apparatus 10, a molded product stocker 13 that holds a plurality of the molded products 2, a mold stocker 14 that holds a plurality of the mold sets 20 or dummy mold sets 20A, and a material stocker 15 that stores the molded material 1 are provided.

A procedure for manufacturing the molded product 2 from the molded material 1 by using the molding apparatus 10 according to the present embodiment will be described below. As an example of the molded product 2, for example, cover glass for a smartphone of 4 to 12 inches in size and the thickness of about 0.3 to 1.5 mm can be cited, but the molded product is not limited to such an example and can be applied to various shapes and uses. For example, the molded product 2 in a shape in which both end portions are curved or in a shape in which the thickness of ends changes can also be formed from the molded material 1 in, for example, a plate shape.

In the molding apparatus 10, a plurality of processes is performed by a plurality of units in parallel by arranging the one mold set 20 in each unit, but for the description below, the procedure focuses on the one mold set 20.

That is, a process on the one mold set 20 is performed by one unit and a process on the other mold set 20 is performed by another handling unit. In FIGS. 1 to 3, a case in which the one mold set 20 is arranged in each unit is shown.

First, the molded material 1 of the material stocker 15 is set to the mold set 20 of the mold stocker 14.

As the carrying-in process, the mold set 20 is set into the load lock chamber 82 and the load lock chamber 82 is closed. Next, the mold set 20 is lowered by the ascent/descent mechanism unit 83. After being lowered, the mold set 20 is horizontally moved by the movement mechanism unit 84 up to the position where the mold set is extruded by the transport unit 70.

When the mold set 20 is moved from the stocker 14 to the load lock chamber 82, for example, the mold set 20 is gripped by a robot arm for transportation and moved. In this case, the mold set 20 can be moved without the upper mold 21 and the lower mold 22 being damaged by the sleeve 23 and the back plate 24 being gripped.

The control unit 12 drives the cylinder shaft 71 in predetermined timing when processes of other units such as the heating unit 30 are completed to move the mold set 20 to the downstream side by a pitch P2 obtained by adding a fixed distance to the unit pitch P1 by pressing against the connecting pin 25 of the mold set 20 to move the mold set 20 onto the first mounting plate 35 of the heating unit 30 (transportation process). At the same time, a plurality of the mold sets 20 arranged on the downstream side is also extruded by the connecting pin 25 to move to the downstream side by the unit pitch P1. That is, the connecting pins 25 of the plurality of mold sets press against the mold sets 20 on the downstream side and so the cylinder shaft 71 moves the mold sets 20 simultaneously.

In the first heating unit 30, the mold set 20 is heated by the upper and lower infrared lamps 34 to soften the molded material 1 at a predetermined temperature (heating treatment). The mold sets 20 are successively sent to the downstream side by the same transportation process as described above in the timing when a plurality of parallel processes is completed to repeat the heating treatment in the same manner.

Next, the plurality of mold sets 20 is moved to the downstream side together by the same transportation process to transport the mold set 20 to the first press unit 40 from the heating unit 30 on the downstream side.

The control unit 12 drives the ascent/descent mechanism unit 43 of the press unit 40 to lower the upper press plate 46 and performs press molding by sandwiching the mold set 20 between the upper and lower press plates 46 while heating the molded material 1 (press process). The mold sets 20 are successively sent to the downstream side by the same transportation process as described above in the timing when a plurality of parallel processes is completed to repeat the press process in the same manner by the press unit 40 on the downstream side.

Subsequently, the mold set 20 is transported to the first slow cooling unit 50 from the press unit 40 on the downstream side by the same transportation process. In the slow cooling unit 50, the mold set 20 is treated to have a predetermined temperature by, for example, adjusting the temperature using heaters while the pressure is held by a pair of the slow cooling plates 51 (slow cooling process).

Next, the mold set 20 is transported from the slow cooling unit 50 to the rapid cooling unit 60 by the same transportation process as described above. The control unit 12 drives the ascent/descent mechanism unit 63 of the rapid cooling unit 60 to lower the upper cooling plate 61 and cools the mold set 20 to a temperature range in which oxidation is prevented even in the atmosphere by sandwiching the mold set 20 between the upper and lower cooling plates 61 (rapid cooling process).

Subsequently, the transportation process is performed. As the transportation process, the mold set 20 is first moved to the downstream side by a pitch P3 obtained by adding a fixed distance to the unit pitch P1 by a movement mechanism unit 76 provided by the transportation path and then horizontally moved to a position just below the load lock chamber 92 by the movement mechanism unit 94. Thereafter, the mold set 20 is moved upward by the ascent/descent mechanism unit 93. When the mold set 20 is moved to the load lock chamber 92, the load lock chamber 92 is opened and the mold set 20 is fetched.

The carried-out mold set 20 is disassembled outside the isolation chamber 11 and the fetched molded product 2 is set to the molded product stocker 13. The new molded material 1 is set to the used mold set 20 to repeat the above molding process.

When the mold set 20 is moved from the carrying-out position to the stocker 14, for example, the mold set 20 is gripped by a robot arm for transportation to be moved. In this case, the mold set 20 can be moved without the upper mold 21 and the lower mold 22 being damaged by the sleeve 23 and the back plate 24 being gripped.

According to the present embodiment, with the back plate 24 provided below the lower mold 22, transportability can be improved by securing the height of the mold set 20 while the thickness of the upper mold 21 and the lower mold 22 being reduced. Generally, if the material structure of glassy carbon is not uniform, the stress inside the structure is biased after an impact being received and thus, when glassy carbon is used as the material of the mold, a difference of internal structure is more likely to arise with an increasing thickness and also a damage phenomenon such as breakage and chipping is more likely to occur. Therefore, the thickness of the mold is limited to prevent breakage depending on the material and it is more difficult to transport the mold with a less total height of the mold, but according to the present embodiment, by providing the back plate 24 on the back surface of the lower mold 22, transportability can be improved by securing the height of the mold set 20 while damage being avoided regardless of the material of the lower mold 22.

In the present embodiment, damage of the lower mold 22 can be prevented by sliding movement of the back plate 24 on plates arranged in parallel. Also by contiguously providing the connecting pins 25 protruding in the transportation direction in the mold set 20, process efficiency can be increased by transporting a plurality of the mold sets 20 together.

Also according to the present embodiment, by adopting a configuration in which the sleeve 23 and the back plate 24 are fixed by the bolt 5 across a protruding portion of the lower mold 22, the sleeve and the back plate can be fixed without a fixing structure such as a screw hole or the like being formed in the lower mold 22.

Further, in the above embodiment, by providing the guide portion 24a on the undersurface of the back plate 24, smooth sliding movement in the traveling direction is enabled without being prevented by a step between plates arranged in parallel. Also, by providing the grooves 24b for air vent on the undersurface of the back plate 24, smooth sliding movement in the traveling direction is enabled without the back plate 24 being adsorbed by the heating treatment or pressurization process so that transportability can be improved.

In the present embodiment, the mold body of the mold set 20 has a two-piece configuration of the upper mold 21 and the lower mold 22, but a three-piece configuration of an upper mold, a middle mold, and a lower mold may also be adopted.

The present invention is not limited to each of the above embodiments and can be carried out by making appropriate alterations. Also, the present invention can be carried out by combining features of a plurality of embodiments. In addition, various modifications can naturally be made within the scope of the present invention.

What is claimed is:
1. A mold set comprising:
   a die including a plurality of parts and a protruding portion protruding to an outer side, the die holding a molded material;
   a back plate laid below the die, the back plate comprising an undersurface and a venting groove along a traveling direction formed on the undersurface; and
   a sleeve surrounding an outer circumference of the die, wherein the sleeve and the back plate are integrated with each other by sandwiching the protruding portion therebetween.
2. The mold set according to claim 1, wherein the sleeve includes a connecting portion extending along the traveling a transportation direction and makes a sliding movement in the traveling transportation direction accompanying an extruding process of extruding the connecting portion.
3. The mold set according to claim 1, wherein the back plate is formed of a material that is different from a material of the die.
4. The mold set according to claim 1, further comprising a guide portion comprising an inclined plane provided on an end in the traveling direction on the undersurface of the back plate.
5. The mold set according to claim 1, further comprising: a plurality of plates forming a predetermined transportation path over which the mold set is slid, the plates including a plate provided in a heating unit that heats the mold set, a plate provided in a press unit that applies pressure to the mold set, and a plate provided in a cooling unit that cools the mold set.

* * * * *